(12) United States Patent
Jaladi

(10) Patent No.: US 11,514,470 B2
(45) Date of Patent: *Nov. 29, 2022

(54) INTEGRATED INTERNET BANKING SYSTEM AND METHOD OF USE

(71) Applicant: San Diego County Credit Union, San Diego, CA (US)

(72) Inventor: Ram Jaladi, San Diego, CA (US)

(73) Assignee: San Diego County Credit Union, San Diego, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/292,226

(22) Filed: Mar. 4, 2019

(65) Prior Publication Data

US 2019/0197573 A1 Jun. 27, 2019

Related U.S. Application Data

(63) Continuation of application No. 14/529,105, filed on Oct. 30, 2014, now Pat. No. 10,262,332.

(51) Int. Cl.
*G06Q 30/00* (2012.01)
*G06Q 30/02* (2012.01)
(Continued)

(52) U.S. Cl.
CPC ....... *G06Q 30/0226* (2013.01); *G06Q 20/108* (2013.01); *G06Q 20/34* (2013.01); *G06Q 20/387* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 5,774,870 A * | 6/1998 | Storey | G06Q 30/0234 |
| | | | 705/14.27 |
| 6,601,761 B1 * | 8/2003 | Katis | G06Q 30/02 |
| | | | 705/26.1 |

(Continued)

FOREIGN PATENT DOCUMENTS

| | | | | |
|---|---|---|---|---|
| WO | WO-2009018443 A1 * | 2/2009 | | G06Q 20/10 |
| WO | WO-2009096768 A1 * | 8/2009 | | G06Q 30/02 |

(Continued)

OTHER PUBLICATIONS

Graham, Cameron. Study: Why Customers Participate in Loyalty Programs. (Jul. 23, 2014). https://technologyadvice.com/blog/marketing/why-customers-participate-loyalty-programs/. Retrieved online Nov. 19, 2018. (Year: 2014).*

(Continued)

*Primary Examiner* — James A Reagan

(57) ABSTRACT

As part of an integrated banking platform, an internet banking platform includes a banking server, a processor, and a memory module. The memory module includes stored computer program code. The memory module, the stored computer program code, and the processor are configured to cause the banking server to receive access to a rewards program server associated with a rewards account platform. Further, the server is caused to receive enrollment information associated with a user, and to connect to the rewards program server. The server is also caused to transmit an enrollment request message to the rewards program server. The enrollment request message includes at least a subset of the enrollment information. Additionally, the server is caused to receive an enrollment response message that indicates whether the user has been enrolled in a rewards account maintained by the rewards account platform.

12 Claims, 5 Drawing Sheets

(51) Int. Cl.
*G06Q 40/02* (2012.01)
*G06Q 20/10* (2012.01)
*G06Q 20/38* (2012.01)
*G06Q 20/34* (2012.01)

(56) References Cited

U.S. PATENT DOCUMENTS

| | | | | |
|---|---|---|---|---|
| 6,609,113 | B1* | 8/2003 | O'Leary | G07F 19/20 705/40 |
| 7,089,208 | B1* | 8/2006 | Levchin | G06Q 20/02 705/35 |
| 7,630,935 | B2* | 12/2009 | Loeger | G06Q 20/00 705/35 |
| 7,660,870 | B2 | 2/2010 | Vandermeijden et al. | |
| 7,676,431 | B2* | 3/2010 | O'Leary | G07F 7/025 705/39 |
| 7,753,264 | B2* | 7/2010 | Shafer | G06Q 20/12 705/14.27 |
| 7,823,772 | B2 | 11/2010 | Vawter | |
| 7,912,777 | B2* | 3/2011 | Freud | G06Q 40/04 705/37 |
| 7,926,711 | B2* | 4/2011 | Taylor | G06Q 20/1085 705/14.1 |
| 7,933,841 | B2 | 4/2011 | Schmeyer et al. | |
| 7,962,409 | B2* | 6/2011 | O'Leary | G06Q 30/0601 705/35 |
| 8,571,983 | B1* | 10/2013 | Blackhurst | G06Q 30/02 705/35 |
| 8,608,061 | B2* | 12/2013 | Krajicek | G06Q 30/0236 705/14.1 |
| 8,676,642 | B1* | 3/2014 | Sheley | G06Q 30/0234 705/14.24 |
| 8,783,561 | B2* | 7/2014 | Wesley | G06Q 30/0236 705/14.1 |
| 8,840,016 | B1 | 9/2014 | Schott et al. | |
| 9,047,617 | B2 | 6/2015 | Sanchez et al. | |
| 9,235,831 | B2* | 1/2016 | Rolf | G06Q 20/20 |
| 9,406,065 | B2* | 8/2016 | Bondesen | G06Q 20/363 |
| 9,646,342 | B2* | 5/2017 | Calman | G06Q 40/02 |
| 10,853,791 | B1* | 12/2020 | Ellis | G06Q 20/4012 |
| 10,878,408 | B1* | 12/2020 | Kurani | G06Q 20/325 |
| 2001/0037204 | A1 | 11/2001 | Horn | |
| 2002/0116266 | A1* | 8/2002 | Marshall | G06Q 10/10 705/14.14 |
| 2003/0158818 | A1* | 8/2003 | George | G06Q 30/0226 705/64 |
| 2004/0078471 | A1* | 4/2004 | Yang | H04L 67/14 709/227 |
| 2004/0122736 | A1* | 6/2004 | Strock | G06Q 30/0207 705/14.31 |
| 2004/0249712 | A1 | 12/2004 | Brown | |
| 2006/0208064 | A1* | 9/2006 | Mendelovich | G06Q 20/227 705/14.4 |
| 2006/0208065 | A1* | 9/2006 | Mendelovich | G06Q 20/227 705/14.27 |
| 2007/0192784 | A1* | 8/2007 | Postrel | G06Q 30/0241 725/23 |
| 2007/0214049 | A1* | 9/2007 | Postrel | H04N 21/2542 725/32 |
| 2008/0154724 | A1 | 6/2008 | Machlin | |
| 2008/0210753 | A1 | 9/2008 | Plozay | |
| 2008/0262915 | A1 | 10/2008 | Gojkovic | |
| 2010/0094690 | A1* | 4/2010 | Beal | G06Q 30/02 705/14.3 |
| 2010/0094699 | A1* | 4/2010 | Beal | G06Q 40/12 705/30 |
| 2010/0114731 | A1* | 5/2010 | Kingston | G06Q 20/10 705/26.1 |
| 2010/0312620 | A1* | 12/2010 | White | G06Q 30/02 705/14.1 |
| 2011/0078008 | A1* | 3/2011 | Postrel | G06Q 30/0223 705/14.1 |
| 2012/0066045 | A1* | 3/2012 | Schmitt | G06Q 30/0226 705/14.25 |
| 2012/0116957 | A1 | 5/2012 | Zanzot | |
| 2012/0191509 | A1 | 7/2012 | McMurtrie | |
| 2012/0191513 | A1 | 7/2012 | Ocher | |
| 2012/0209688 | A1 | 8/2012 | Lamothe | |
| 2012/0233073 | A1* | 9/2012 | Salmon | G06Q 20/381 705/44 |
| 2012/0259686 | A1* | 10/2012 | Yurow | G06Q 30/0207 705/14.17 |
| 2013/0024371 | A1* | 1/2013 | Hariramani | G06Q 20/384 705/41 |
| 2013/0054454 | A1* | 2/2013 | Purves | H04L 67/306 705/41 |
| 2013/0151325 | A1* | 6/2013 | Poidomani | G06Q 30/0226 705/14.27 |
| 2013/0211987 | A1* | 8/2013 | Louie | G06Q 40/00 705/35 |
| 2013/0226686 | A1 | 8/2013 | Grossman | |
| 2013/0238408 | A1* | 9/2013 | Cooke | G06Q 30/0207 705/14.27 |
| 2013/0290096 | A1* | 10/2013 | Lizotte, III | G06Q 30/0246 705/14.45 |
| 2013/0325567 | A1* | 12/2013 | Bradley | G06Q 30/0207 705/14.1 |
| 2014/0058812 | A1* | 2/2014 | Bender | G06Q 30/0209 705/14.12 |
| 2014/0074569 | A1* | 3/2014 | Francis | G06Q 20/24 705/14.3 |
| 2014/0074617 | A1* | 3/2014 | Mukherji | G06Q 30/0281 705/14.64 |
| 2014/0129435 | A1* | 5/2014 | Pardo | G06Q 20/363 705/41 |
| 2014/0200983 | A1* | 7/2014 | Bacastow | G06Q 20/12 705/14.28 |
| 2015/0066691 | A1* | 3/2015 | Ready | G06Q 20/363 705/26.8 |
| 2015/0112783 | A1 | 4/2015 | Nikolaev | |
| 2015/0220914 | A1* | 8/2015 | Purves | G06Q 30/0633 705/41 |
| 2015/0254549 | A1* | 9/2015 | Newcombe | G06K 19/083 235/493 |
| 2015/0254638 | A1* | 9/2015 | Bondesen | G06Q 20/36 705/41 |
| 2015/0254639 | A1* | 9/2015 | Radu | G06Q 20/20 705/41 |
| 2015/0310477 | A1* | 10/2015 | Mankoff | G06Q 30/0226 705/14.27 |
| 2016/0012465 | A1* | 1/2016 | Sharp | G06Q 20/321 705/14.17 |
| 2016/0048864 | A1* | 2/2016 | Beer | G06Q 30/0226 705/14.27 |
| 2016/0086153 | A1* | 3/2016 | Rolf | G06Q 20/24 705/41 |

FOREIGN PATENT DOCUMENTS

| WO | WO-2009096963 A1 * | 8/2009 | G06Q 20/40 |
|---|---|---|---|
| WO | 2010144496 A2 | 12/2010 | |
| WO | WO-2010144496 A2 * | 12/2010 | G06Q 30/00 |

OTHER PUBLICATIONS

Bank of America. Mobile & Online Banking Benefits and Features. (Jun. 21, 2012). Retrieved online Sep. 27, 2021 .https://www.bankofamerica.com/online-banking/mobile-and-online-banking-features/overview/ (Year: 2012).*

WALLETHUB. Rewards Checking. (Feb. 29, 2012). Retrieved online Jun. 8, 2022. https://wallethub.com/checking-accounts/rewards (Year: 2012).*

Graham, Cameron, "Study: Why Customers Participate in Loyalty Programs," (Jul. 23, 2014), <http://technologyadvice.com/blog/

(56) References Cited

OTHER PUBLICATIONS marketing/why-customers-participate-loyalty-programs/> Retreived onlune Nov. 19, 2018.

* cited by examiner

INTEGRATED INTERNET BANKING SYSTEM AND METHOD OF USE

RELATED APPLICATIONS

The present application is a continuation of U.S. patent application Ser. No. 14/529,105 filed Oct. 30, 2014, which is incorporated herein by reference in its entirety.

TECHNICAL FIELD

This disclosure relates to the field of internet banking, and more specifically to an integrated internet banking system and method of use, including integrating an internet banking platform with a rewards program.

BACKGROUND

Current internet banking implementations provide for the management of bank accounts over the internet. Conventional rewards programs allow subscribing purchasers to receive rewards (e.g., cash-back, promotional items, discounts, and the like) for certain types of purchases. Rewards programs allow for the subscribing purchasers to manage their rewards, activate various payment cards for enrollment in the rewards program, and so on, all over the internet. In addition, conventional rewards programs provide subscribing merchants with additional promotional and marketing opportunities. Namely, subscribing merchants may incentivize subscribing users/purchasers to make purchases with the merchants and thereby receive rewards. One example of a rewards program is Mogl™. Mogl allows subscribers to obtain rewards based on purchases made, and maintains rewards programs specific to particular geographic regions. This allows Mogl subscribers to donate earned rewards to local causes (e.g., charitable organizations), as well as to apply the rewards to purchases from local retailers of choice (including restaurants, shops, and the like).

In conventional rewards programs, subscribing users have no incentive to use one payment card versus another. As such, there is currently no way for banks, credit unions, or other financial institutions to capitalize on the incentives that rewards programs platforms provide to subscribing users. Another issue with conventional solutions is that it may be difficult to track and manage rewards, particularly when a subscribing user has enrolled multiple payment cards with the rewards program. This problem is made worse when the rewards, such as cash-back rewards associated with a payment card, are not integrated with the subscribing user's internet banking account.

BRIEF SUMMARY OF THE DISCLOSURE

In light of the above-described shortcomings of conventional internet banking environments, there exists a long-felt need for an integrated internet banking platform that integrates the enrollment process of enrolling in a rewards program. In particular, there is a long-felt need for an internet banking platform that allows a user to, from the user's account maintained on the internet banking platform, enroll in a rewards program maintained by a rewards program platform, and to activate one or more of the user's payment cards with the rewards program. This integration provides a bank, credit union, or financial institution with the opportunity to capitalize on the incentives created by the rewards program. For example, it may be beneficial to a first bank when the user enrolls in the rewards program and activates one or more of the user's payment cards issued by the first bank, rather than activating other cards issued by other banks. Furthermore, there exists a need for more integration of internet banking platforms with rewards platforms by, for example, transferring the earned rewards from the rewards program directly into the user's existing bank account.

Through the systems and methods disclosed herein, specifically regarding (by way of example) the integration of the rewards account platform with the internet banking platform, banks and financial institutions may incentivize users to activate the banks' payment cards with the rewards program, and may also streamline the process of enrollment in and management of the rewards account/program. Embodiments of the present disclosure provide for highly integrated user experiences in navigating internet banking and rewards account platforms. Moreover, the current disclosure describes a more efficient way for a user to take advantage of a wide range of rewards programs through the user's own existing internet banking account and, for example, whilst navigating the associated internet banking platform. Such navigation may include, in various embodiments, enrolling, viewing, or managing rewards earned from a rewards program, without requiring the user to leave the internet banking platform. This integrated user experience further incentivizes and facilitates the user to activate in the reward program the user's payment cards associated with the integrated internet banking account. As such, the disclosed embodiments provide significant benefits and use incentives to not only the bank or financial institution, but also to the user and the rewards program platform provider.

In one embodiment of the disclosure, an internet banking platform includes a banking server, a processor, and a memory module configured to cause the banking server to receive access to a rewards program server associated with a rewards account platform. The banking server then receives enrollment information associated with the bank account user and establishes a connection to the rewards program server in order to transmit an enrollment request message that includes at least a subset of the enrollment information to the rewards program server. The enrollment information may include, for example, the user's name, address, email, postal code and account user name. After transmitting an enrollment request message, the banking server receives an enrollment response message that indicates whether the user has been enrolled in a rewards account maintained by the rewards account platform.

In another embodiment of the internet banking platform, the banking server may be caused to direct the user to the rewards account platform after receiving an enrollment message indicating that the user is enrolled into the rewards account. The enrollment request message includes information about the payment card to be associated with the user's rewards account. In some embodiments, the payment card includes a credit card and/or debit card associated with the user's bank account. The rewards account platform provides the rewards account with a reward subsequent to the banking server receiving a response message indicating that the user has been enrolled. In some embodiments, rewards are based on purchases made from a merchant subscribed to the rewards account platform.

BRIEF DESCRIPTION OF THE DRAWINGS

Further aspects of the present disclosure will be more readily appreciated upon review of the description herein of the various disclosed embodiments, when taken in conjunction with the accompanying figures, in which.

The figures are described in greater detail in the description and examples below, are provided for purposes of illustration only, and merely depict typical or example embodiments of the disclosure. The figures are not intended to be exhaustive or to limit the disclosure to the precise form disclosed. It should be understood that the disclosure may be practiced with modification or alteration, and that the disclosure may be limited only by the claims and the equivalents thereof.

DETAILED DESCRIPTION

The present disclosure is directed to an integrated internet banking systems and methods of use, and specifically to an internet banking platform integrated with a rewards account platform, and to various embodiments of such systems and methods.

Figure 1:
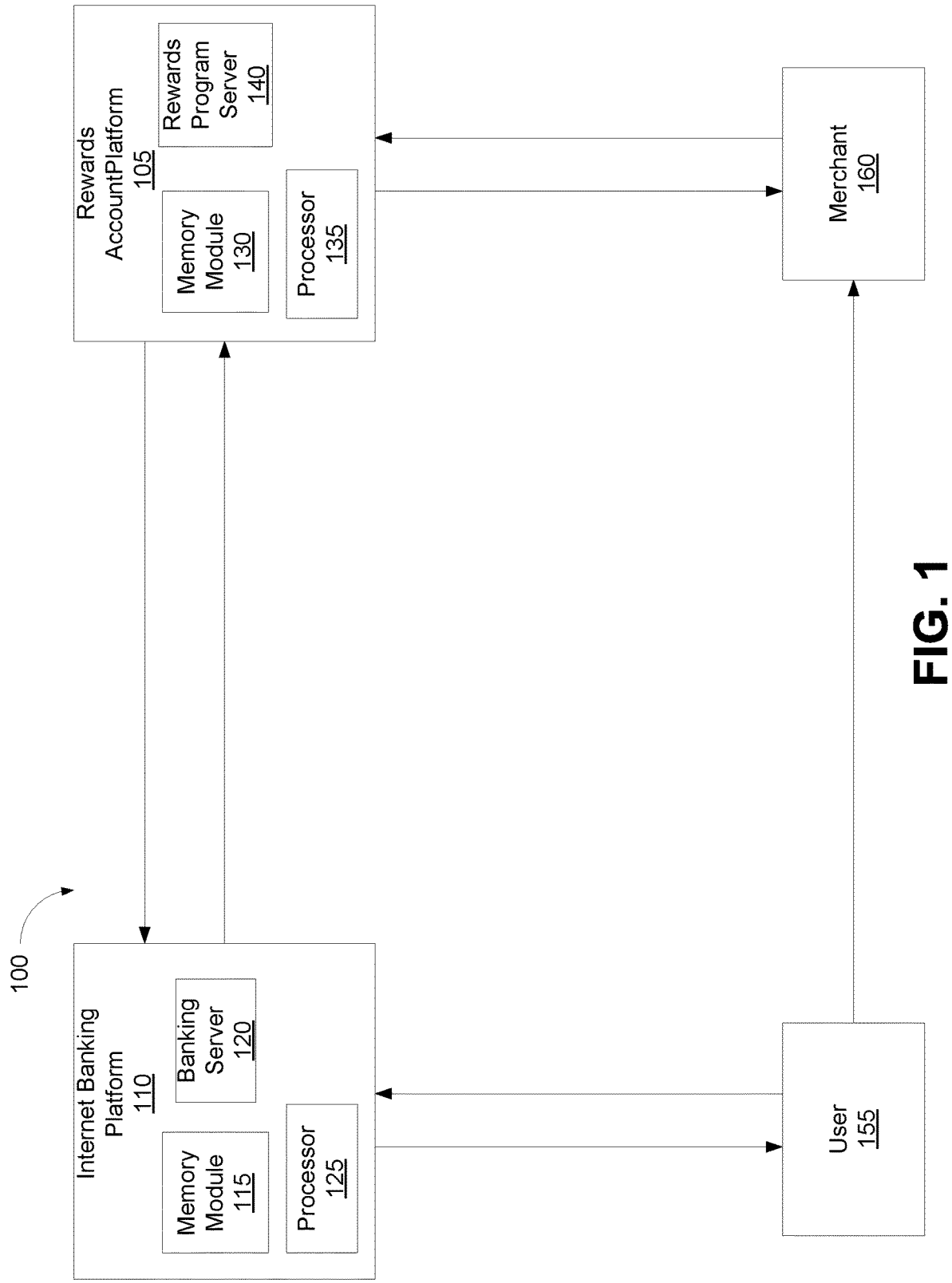
FIG. 1 illustrates an example integrated banking platform, in which an internet banking platform is integrated with a rewards account platform.

As illustrated in FIG. 1, one embodiment of the disclosure includes integrated banking platform 100 for integrating an internet banking platform with a rewards account platform. As shown in FIG. 1, integrated banking platform 100 includes rewards account platform 105, internet banking platform 110, user 155, and merchant 160.

In general, the elements of integrated banking platform 100 may interact with one another via a communication medium (e.g., as represented by the various arrows in FIG. 1). The communication medium may be implemented in a variety of forms. For example, the communication medium may include an Internet connection, such as a local area network ("LAN"), a wide area network ("WAN"), a fiber optic network, internet over power lines, a hard-wired connection (e.g., a bus), and the like, or any other kind of network connection or series of network connections. Further, example implementations of the communication medium may include any combination of routers, cables, modems, switches, fiber optics, wires, radio, and the like. The communication medium may also be implemented using various wireless standards, such as Bluetooth, Wi-Fi, 4G LTE, and the like. Upon studying the present disclosure, one of skill in the art will recognize other ways to implement the communication medium for communications purposes, and with specific regard to the elements of integrated banking platform 100.

Referring again to FIG. 1, internet banking platform 110 may be maintained and operated by a bank, credit union, or other financial institution that provides banking solutions to users. For example, internet banking platform 110 may allow users to manage checking and savings accounts online, make transfers, deposit checks (e.g., via smartphone camera), pay bills, and so on. San Diego County Credit Union®, the assignee of the current disclosure, provides an example of one such internet banking platform.

In integrated banking platform 100, user 155 may access internet banking platform 110 by, for example, logging on through the communication medium using a computer, a tablet, smartphone, or smartwatch, etc. Upon logging in, user 155 may access various web pages maintained by internet banking platform 110. According to various embodiments of the present disclosure, one such page may include, for example, the option for user 155 to enroll in a rewards program provided by a third party via rewards account platform 105. By accessing such an enrollment page, user 155 may provide information for enrolling in the rewards program, including identifying information about user 155, information about payment cards to be activated with the rewards program, and so on, as described in further detail herein.

As described above, upon enrolling in the rewards program (i.e., by creating a rewards account for user 155), user 155 may obtain rewards based on purchases made, by way of example, with merchants 160 who have subscribed in the rewards program. Merchant 160 may include retailers, restaurants, service providers, e-commerce merchants, and the like. In exchange for enrolling in the rewards program, such merchants 160 may receive benefits, including being promoted to enrolled users 155. To illustrate, user 155 may navigate rewards program platform 105 to view various subscribed merchants 160 and promotions, advertisements, and the like, that merchants 160 are providing. As such, rewards account platform 105 provides an opportunity for merchant 160 to market to user 155, and this opportunity is further enhanced by the rewards available to users 155.

Turning again to internet banking platform 110, as illustrated in FIG. 1, internet banking platform 110 includes memory module 115, banking server 120, and processor 125. Banking server 120 may direct communications made over the communication medium. Banking server 120 may be, for example, an Internet server, a router, a desktop or laptop computer, a smartphone, a tablet, a processor, a module, or the like. In one embodiment, server 120 directs communications between the communication medium and memory module 115 and/or processor 125. For example, server 120 may update information stored on memory module 115, or server 120 may execute instructions received over the communication medium in real time. Memory module 115 stores computer program code. Memory module 115 may be, for example, a magnetic hard drive, a solid-state drive, a database, cloud-computing storage, cache, and the like, and will be further described below with regard to FIG. 4. Memory module 115 also includes stored computer program code, which aspect of memory module 115 is further described below with regard to FIG. 5, along with banking server 120 and processor 125.

With regard to rewards account platform 105, as illustrated in FIG. 1, rewards account platform 105 includes memory module 130, rewards program server 140, and processor 135, each of which may be substantially similar, in terms of respective structure and in some instances functionality, to memory module 115, banking server 120, and processor 125, respectively.

According to one embodiment of internet banking platform 110, memory module 115, the stored computer program code, and processor 125, are configured to cause banking server 120 to receive access to rewards program server 140. Rewards program server 140 is associated with rewards account platform 105. For example, rewards program server 140 may be maintained and/or directed by rewards account platform 105, and users' 155 or merchants' 160 navigation of rewards account platform 105 may be facilitated by rewards program server 140. Banking server 120 may receive access to rewards program server 140 through the communication medium described above, for example. Such access may be received subsequent to sending a request sent through internet transaction protocols and associated layers, applications program interfaces (APIs), and web servers, as would be understood by one of ordinary skill in the art upon reading the present disclosure. Upon rewards account platform 105 granting such a request for access, rewards account platform 105 may notify banking server 120 that access to rewards program server 140 has been granted.

Memory module 115, the stored computer program code, and processor 125, are further configured to cause banking server 120 to receive enrollment information associated with user 155. This may be done, for example, through a graphical user interface (GUI) displayed to user 155 by internet banking platform 110. Additionally, the enrollment information may be stored automatically by internet banking platform 110 such that the information may be auto populated when user 155 selects the option of enrolling in the rewards program (again, for example, through a GUI). Enrollment information received may, to illustrate, include identifying information for user 155 (e.g., name, email address, etc.), account information associated with a bank account navigable through internet banking platform 110, information related to one or more payment cards active with the bank account (e.g., card number, expiration date, card provider, etc.), and the like. Moreover, memory module 115, the stored computer program code, and processor 125, are configured to cause banking server 120 to connect to rewards program server 140. Connection to rewards program server 140 may be accomplished over the communication medium, and may be substantially similar in terms of protocol to the above description regarding banking server 120's access to rewards program server 140.

Figure 2:
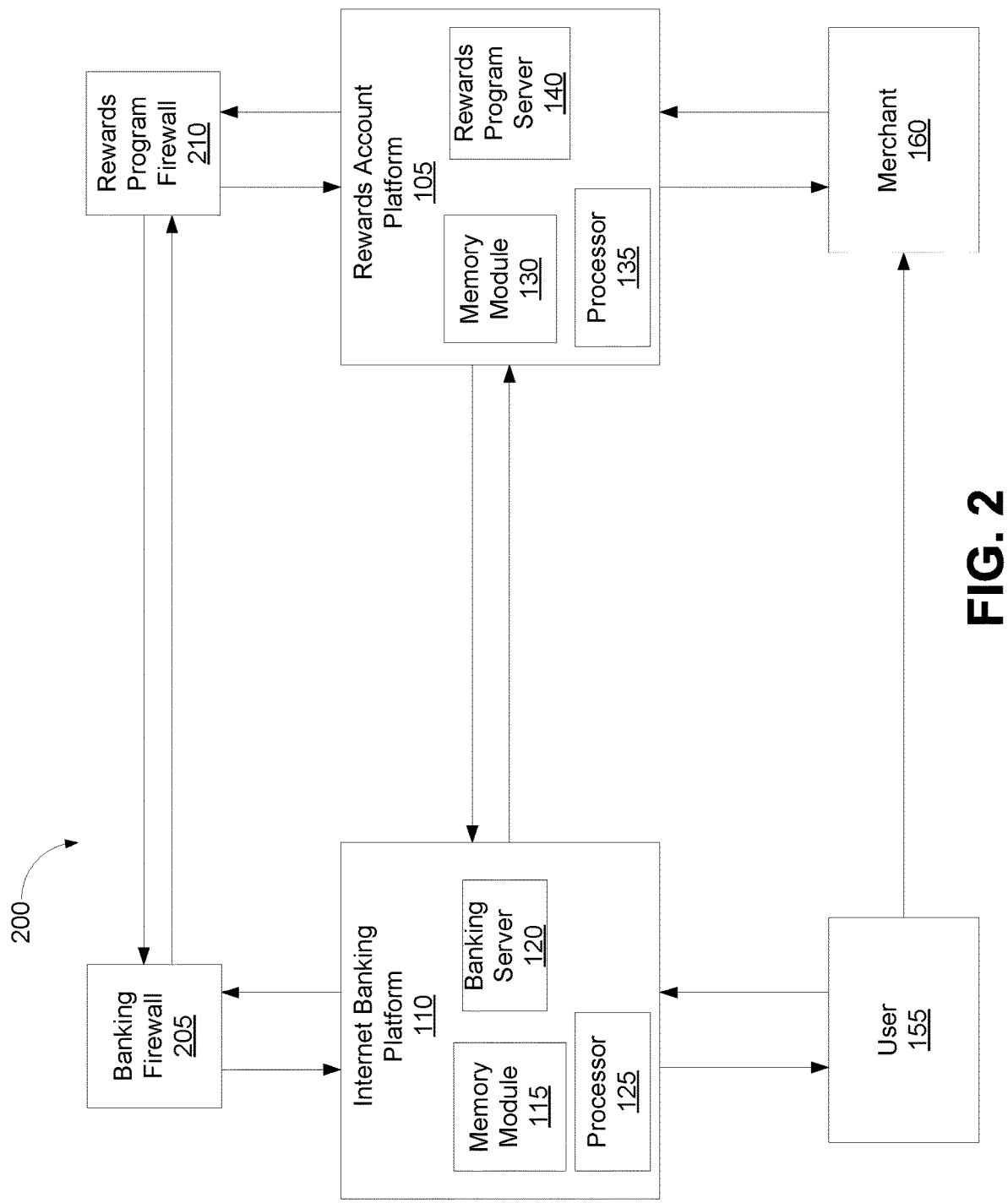
FIG. 2 illustrates an additional example integrated banking platform, in which an internet banking platform is integrated with a rewards account platform, including one or more firewalls.

One embodiment of integrated banking platform 100 includes banking server 120 connecting to rewards program server 140 through a first firewall and a second firewall. Generally, firewalls may be used in internet applications to, for example, establish a secure connection may between two servers and to control the flow of network information between two established (e.g., connected) networks or servers. For example, in one embodiment of the disclosure—namely, in integrated banking platform 200 (illustrated in FIG. 2)—internet banking platform 110 optionally connects to rewards account platform 105 through one or more of banking firewall 205 and rewards program firewall 210. Firewalls 205 and 210 may prevent unfettered access to internet banking platform 110 and rewards account platform 105, and, as such, may in general be used (e.g., by financial institutions) to secure sensitive information while still allowing controlled access and enforcing network security.

Referring again to FIG. 1, upon establishing connection with rewards program server 140, banking server 120 may communicate therewith (and vice versa) over the communication medium. Specifically, memory module 115, the stored computer program code, and processor 125, are configured to cause banking server 120 transmit an enrollment request message to rewards program server 140. The enrollment request message includes at least a subset of the enrollment information, and may include additional information such as, for example, user preferences and various options relating to integration of internet banking platform 110 with rewards account platform 105 (e.g., as further described hereinbelow).

Further, in one example implementation of the disclosure, the enrollment request message includes information about one or more payment cards to be associated with the rewards account. Specifically, such payment cards may be those provided and/or serviced by the financial institution that maintains internet banking platform 110. And in one instance of the disclosure, the payment card is one of a credit or a debit card. The payment card may, however, be any type of card that user 155 may use with various merchants 160 to complete purchase transactions. Additionally, a card, or payment card, as used herein, may refer to a conventional magnetic-stripe credit card or debit card, or similar proximity payment device (used on its own or incorporated into another device such as a smartphone, tablet, etc.) having, for example, near field communications (NFC) capabilities, such as a radio frequency identification (RFID) chip, implemented therein. A card may further refer to virtual or limited-use account numbers and to electronic wallets.

Rewards program server 140 may then receive the enrollment request message at rewards account platform 105. Rewards program server 140 may then parse the enrollment message to obtain and process the enrollment information. For example, rewards program server 140, in conjunction with memory module 130 and/or processor 135, may process the enrollment information and determine that additional information is required to effect an enrollment in the rewards program. Upon such a determination, rewards program server 140 may, by way of example, send an enrollment response message to internet banking platform 110 indicating that additional information is required, that user 155 is already enrolled, that user 155 does not qualify for enrollment, and so on. If, however, rewards account platform 105 is able to and does effect enrollment in the rewards program based on the enrollment information, the enrollment response message may indicate that user 155 has been enrolled in the rewards program.

Memory module 115, the stored computer program code, and processor 125, are configured to cause banking server 120 to receive the enrollment response message sent from rewards account platform 105. Specifically, banking server 120 may receive the enrollment message that indicates whether user 155 has been enrolled in the rewards account maintained by rewards account platform 105. Upon receiving an enrollment message that indicates that user 155 has been enrolled, banking server 120, in one embodiment of the disclosure, directs user 155 to rewards account platform 105, including, for example, to a website maintained by rewards account platform 105. For example, upon user 155 being enrolled, and when user 155 accesses internet banking platform 110 (e.g., by accessing user 155's account maintained thereby), banking server 120 may provide a hyperlink for user 155 to click to access rewards account platform 105.

As explained above, allowing user 155 to enroll in a rewards account provided by rewards account platform 105, and/or to access rewards account platform 105 directly from internet banking platform 110, may incentivize user 155 to activate one or more of user 155's payment cards with the credit union, bank, or financial institution providing internet banking platform 110. Such integration may streamline the functionality of both the rewards program, and of the internet banking experience provided by internet banking platform 110, thus synergistically enhancing user 155's experience with both platforms (e.g., 110 and 105).

In one embodiment of integrated banking platform 100, upon or subsequent to banking server 120 receiving a response message indicating that user 155 has been enrolled with rewards account platform 105, rewards account platform 105 may provide user 155's rewards account with a reward or rewards. As described above, rewards account platform 105 may provide these rewards based upon purchases made from merchants 160 with user 155's activated payment cards. In a further embodiment, the reward is one of a discount applied to purchases from merchant 160, cash back from such purchases, free merchandise or services from merchant 160 or other subscribing merchants, and other such promotional incentives that may be provided by merchants 160. For example, for a user 155 based in San Diego, Calif., the reward may include free tickets to the San Diego County Fair, or to a local concert venue, such as Belly Up. In one embodiment, the rewards may be incentives to enroll in further services provided by the financial institution or credit union maintaining internet banking platform 110. For example, the reward may include a fee waiver for a credit card provided by the financial institution, enhanced points for purchases made using such a credit card, discounted financial planning services, and the like. Such rewards further incentivize user 155 to participate in the various offerings of such a bank, credit union, or financial institution, and, as referred to above, may be beneficial to not only user 155 but also to the financial institution and to the rewards program provider (who, for example, receives advertising revenue according to site traffic).

Figure 3:
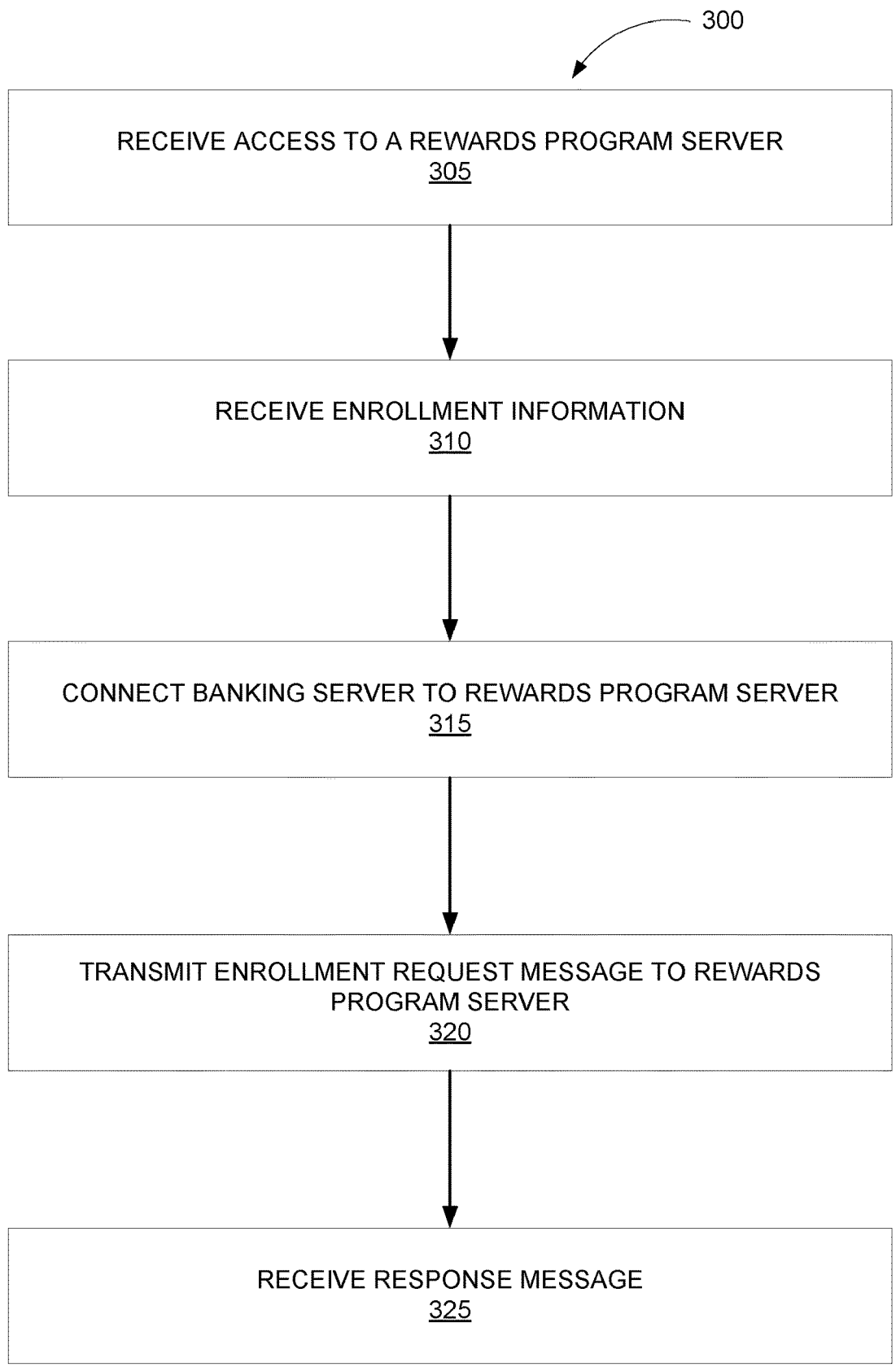
FIG. 3 illustrates an example method for integrating a rewards account platform with an internet banking platform.

FIG. 3 is an example flow diagram that illustrates one embodiment of method 300 for integrating a rewards account platform with an internet banking platform, including but not limited to, for example, across multiple rewards account platforms linked to multiple payment cards. Method 300 and related embodiments thereof may be used to integrate an internet banking platform provided by a financial institution with the user-enrollment process of a rewards program provided by a third-party. Additionally, method 300 may incentivize account holders to activate one or more payment cards in the rewards program (e.g., due to the above-described benefits of the integrations disclosed herein). In addition to streamlining interaction between the rewards platform and the internet banking platform, method 300 may also enhance the user experience with both platforms, facilitate further user of both the rewards program and the user's bank account and other services provided by the financial institution, and strengthen merchants' marketing abilities. Specifically, the operations of method 300 may be used to enroll a user in a third-party rewards program directly from an internet banking platform that also provides for the user's online banking needs, and to subsequently direct and manage the user's rewards account to integrate the same with the internet banking platform.

As illustrated in FIG. 3, one embodiment of method 300 for integrating the rewards account platform with the internet banking platform involves, at operation 305, a banking server receiving access to a rewards program server. The rewards program server is associated with the rewards account platform, while the banking server is associated with the internet banking platform. As described above with regard to integrated banking platform 100, access may include permission for the banking server to connect to the rewards program server via a communication medium. At operation 310, method 300 further includes receiving enrollment information at the banking server. The enrollment information is associated with a user who, typically, wishes to enroll in the rewards program. This information, which is described in detail above, may vary according to the financial institution providing the internet banking platform, and according to the provider of the rewards account platform. In embodiments where the rewards program includes regionally based merchants, address and zip code information may facilitate focusing the promotions and advertisements available to the user through the rewards account platform. This geographical enrollment information, in one instance of the disclosure, may be obtained by location-based services from the user's smartphone or other connected devices, for example, when the user accesses the internet banking platform with such a connected device.

Returning again to FIG. 3, operation 315 involves connecting the banking server to the rewards program server. After establishing such a connection between the two servers, method 300 includes transmitting an enrollment request message to the rewards program server (namely, at operation 320). The enrollment request message includes payment card information associated with one or more payment cards active with the internet banking platform. For example, the user (or account holder) may have established with a financial institution a check card and one or more credit cards, each having payment card information that identifies the card. Providing such information in an enrollment request message may allow for the rewards account platform to link the cards to the user, such that, for example, when the user makes a purchase from a subscribing merchant with one of the cards, the rewards account platform may associate any earned rewards with the user's rewards account. The enrollment request message also includes at least a subset of the enrollment information received from the user. In response to receiving the transmitted enrollment request message, the rewards account platform may disposition the message, as described above (e.g., accept or reject enrollment, require more information, etc.). At operation 325, method 300 includes the banking server receiving an enrollment response message that indicates whether the user has been enrolled in the rewards account.

A further embodiment of method 300 includes activating the one or more payment cards in the rewards account (e.g., to begin receiving rewards), upon the user being enrolled in the rewards program. Method 300, in one instance of the disclosure, includes receiving a reward into the rewards account after the banking server receives a response message indicating that the user has been enrolled. Substantially similar to the above description with regard to integrated banking platform 100, the reward may be based on a purchase made from a merchant subscribed to the rewards account platform.

Figure 4:
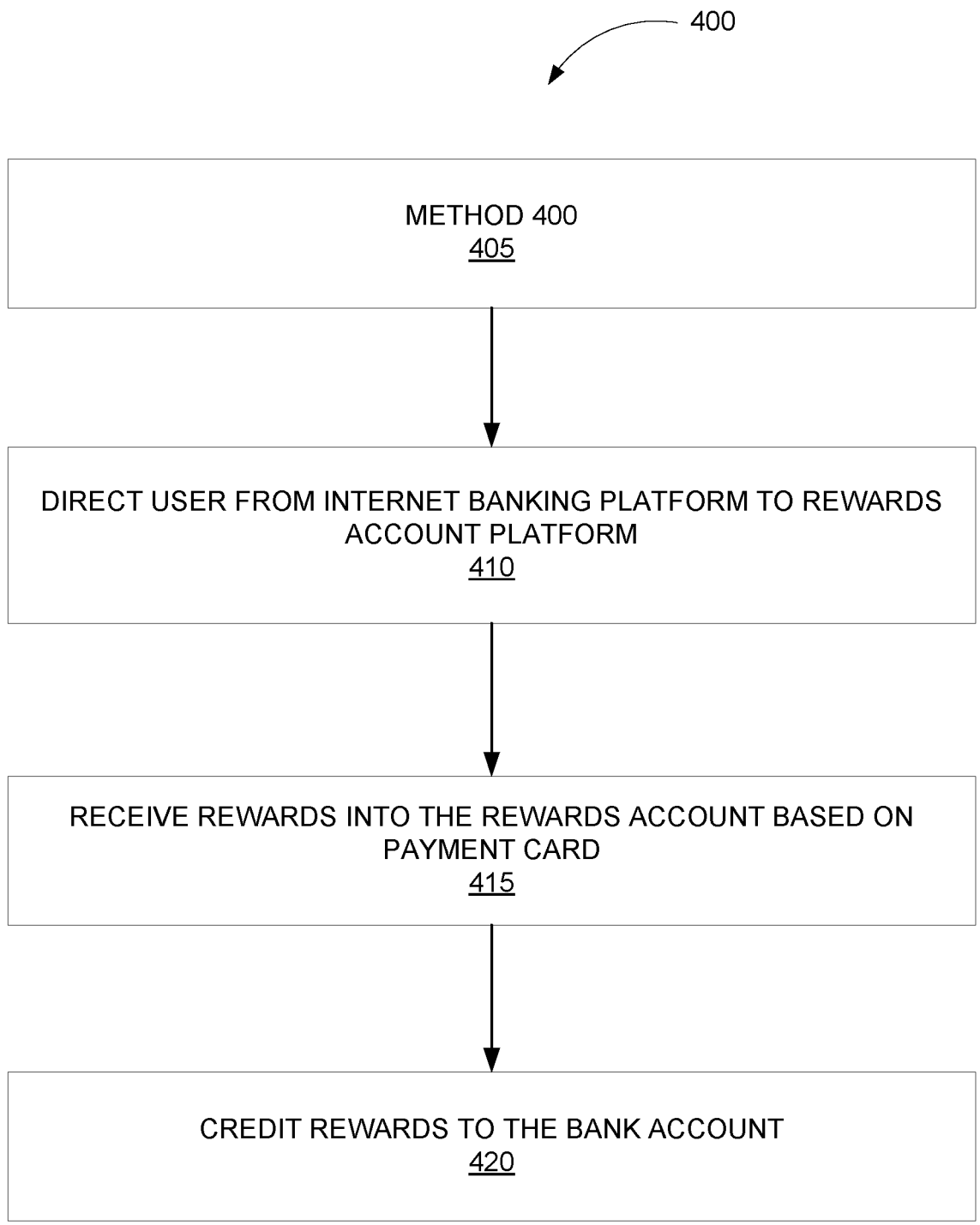
FIG. 4 illustrates an additional example method for integrating a rewards account platform with an internet banking platform.

FIG. 4 is an example flow diagram that illustrates one embodiment of method 400 for integrating a rewards account platform with an internet banking platform. Method 400, at operation 405, may include one or more of the above-described operations of method 300. In one example implementation of the disclosure, method 400 includes directing the user from the internet banking platform to the rewards account platform. This is illustrated at operation 410, and may be done, by way of example, upon or after the banking server receiving an enrollment response message that indicates the user has been enrolled (e.g., at operation 325 of method 300).

In one embodiment of the disclosure, the internet banking platform is accessed from a mobile application. For example, an account holder (or user) may launch a financial institution's mobile application from a connected device, such as a smartphone, that connects (e.g., via a communication medium and/or a firewall) to the internet banking platform. Upon establishing connection, the user may navigate one or more sites maintained by the internet banking platform (e.g., to make deposits, transfers, update settings, etc., regarding the user's account with the financial institution). Further to this embodiment, directing the user from the internet banking platform to the rewards account platform (e.g., as described in connection with operation 410), includes launching a mobile application associated with the rewards account platform. As such, in this embodiment, the integration of the internet banking platform with the rewards account platform, along with the above-described benefits, may be well adapted to mobile environments.

According to an additional example implementation, method 400 includes, at operation 415, receiving the reward into the rewards account. At operation 420, a further embodiment of method 400 includes crediting the rewards to the bank account associated with the card linked to the rewards account. In instances where the user maintains multiple payment cards with multiple accounts provided by the financial institution, the reward is received in each of the one or more accounts depending on an association between the accounts and the payment cards. For example, a first card may be associated with a first account and may have generated a first reward—in such a case, the first reward would be received by the internet banking platform and deposited into the first account. And so one with, for example, a respective second card associated with a second account and a second reward. In another example, multiple cards may be associated with a single account, and the rewards generated by those cards may all be deposited into a single account, or the rewards may be distributed across accounts regardless of associations between the accounts and cards.

In general, the various operations of method 300 and 400 described herein may be accomplished using or may pertain to components or features of the various systems and/or apparatus with their respective components and subcomponents, described herein. Moreover, in various embodiments, features and functions described herein with regard to FIGS. 1 and 2 may be implemented as operations of methods (e.g., method 300 and method 400), in addition to being implemented as part of systems or apparatus, such as integrated banking platforms 100 and 200 described hereinabove.

Figure 5:
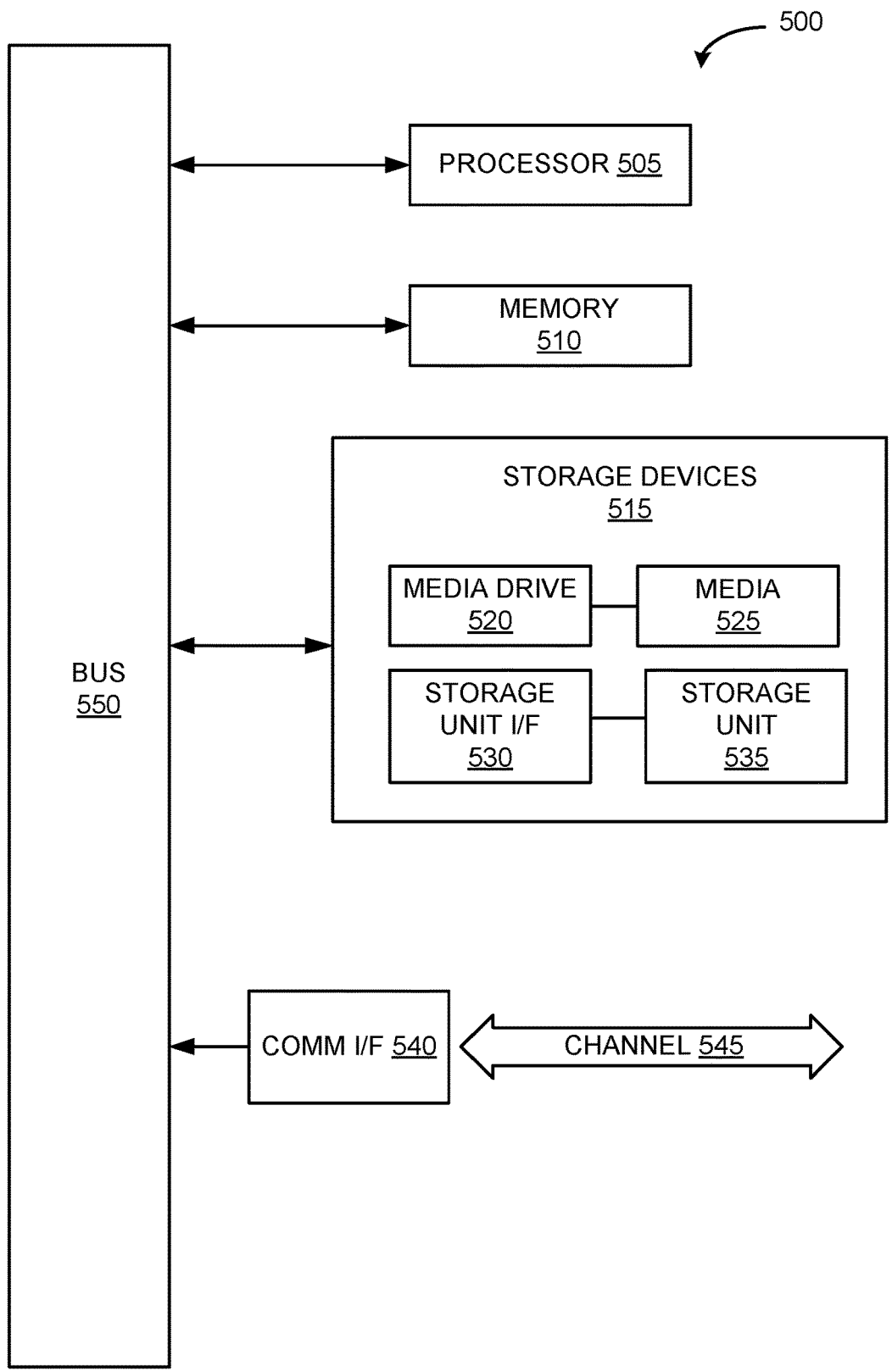
FIG. 5 illustrates an example computing module that may be used to implement features of various embodiments of the disclosure.

FIG. 5 illustrates example computing module 500, which may be used to implement various features of the systems and methods disclosed herein. In one embodiment of the disclosure, computing module 500 includes a non-transitory computer-readable medium having computer-executable program code embodied thereon. The computer-executable program code is configured to cause a banking server of an internet banking computer system (e.g., memory module 115, banking server 120, and/or processor 125, and components thereof) to receive access to a rewards program server associated with a rewards account platform. The computer-executable program code is also configured to cause banking server to receive enrollment information associated with a user and to connect to the rewards program server.

Additionally, the computer-executable program code is configured to transmit an enrollment request message to the rewards program server. The enrollment request message includes at least a subset of the enrollment information. In one embodiment, the enrollment request message includes information about a payment card to be associated with the user's rewards account, which is maintained by the rewards account platform. The computer-executable program code, in a further example, is configured to cause the banking server to facilitate the user selecting one or more payment cards to be enrolled in the rewards program.

In a further example implementation, the computer-executable program code is configured to cause the banking server to receive a reward from the rewards account and to provide the user with the option to credit the reward to a bank account maintained on the internet banking platform. The computer-executable program code may also, for example, be configured to cause the banking server to deposit the reward into the bank account. For example, the user may earn rewards after the payment card is enrolled in the rewards program and then used to make purchases from a subscribed merchant. The internet banking platform may receive, by way of illustration, cash-back rewards from the rewards account and then optionally deposit the rewards into the bank account. In other instances, rewards may be automatically deposited into the user's bank account (e.g., using the banking server and without manual intervention).

Referring again to FIG. 5, computing module 500 may represent, for example, computing or processing capabilities found within desktop, laptop, notebook, and tablet computers; hand-held computing devices (tablets, PDA's, smart phones, cell phones, palmtops, smart-watches, smart-glasses etc.); mainframes, supercomputers, workstations or servers; or any other type of special-purpose or general-purpose computing devices as may be desirable or appropriate for a given application or environment. Computing module 500 may also represent computing capabilities embedded within or otherwise available to a given device. For example, a computing module may be found in other electronic devices such as, for example, digital cameras, navigation systems, cellular telephones, portable computing devices, modems, routers, WAPs, terminals and other electronic devices that may include some form of processing capability.

Computing module 500 may include, for example, one or more processors, controllers, control modules, or other processing devices, such as a processor 505. Processor 505 may be implemented using a general-purpose or special-purpose processing engine such as, for example, a microprocessor, controller, or other control logic. In the illustrated example, processor 505 is connected to a bus 550, although any communication medium can be used to facilitate interaction with other components of computing module 500 or to communicate externally.

Computing module 500 may also include one or more memory modules, simply referred to herein as main memory 510. For example, random access memory (RAM) or other dynamic memory may be used for storing information and instructions to be executed by processor 505. Main memory 510 may also be used for storing temporary variables or other intermediate information during execution of instructions to be executed by processor 505. Computing module 500 may likewise include a read only memory ("ROM") or other static storage device coupled to bus 550 for storing static information and instructions for processor 505.

The computing module 500 may also include one or more various forms of information storage mechanism 515, which may include, for example, a media drive 520 and a storage unit interface 530. The media drive 520 may include a drive or other mechanism to support fixed or removable storage media 525. For example, a hard disk drive, a solid state drive, a magnetic tape drive, an optical disk drive, a CD or DVD drive (R or RW), or other removable or fixed media drive may be provided. Accordingly, storage media 525 may include, for example, a hard disk, a solid state drive, magnetic tape, cartridge, optical disk, a CD or DVD, or other fixed or removable medium that is read by, written to or accessed by media drive 520. As these examples illustrate, the storage media 525 can include a computer usable storage medium having stored therein computer software or data.

In alternative embodiments, information storage mechanism 515 may include other similar instrumentalities for allowing computer programs or other instructions or data to be loaded into computing module 500. Such instrumentalities may include, for example, a fixed or removable storage unit 535 and a storage interface 530. Examples of such storage units 535 and storage interfaces 530 can include a program cartridge and cartridge interface, a removable memory (for example, a flash memory or other removable memory module) and memory slot, a PCMCIA slot and card, and other fixed or removable storage units 535 and storage interfaces 530 that allow software and data to be transferred from the storage unit 535 to computing module 500.

Computing module 500 may also include communications interface 540. Communications interface 540 may be used to allow software and data to be transferred between computing module 500 and external devices. Examples of communications interface 540 may include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 540 may typically be carried on signals, which can be electronic, electromagnetic (which includes optical) or other signals capable of being exchanged by a given communications interface 540. These signals may be provided to communications interface 540 via a channel 545. This channel 545 may carry signals and may be implemented using a wired or wireless communication medium. Some examples of a channel may include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 510, storage unit 535, media 525, and channel 545. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions may enable computing module 500 to perform features or functions of the present application as discussed herein.

Although described above in terms of various example embodiments and implementations, it should be understood that the various features, aspects, and functionalities described in one or more of the individual embodiments are not limited in their applicability to the particular embodiments with which they are described, but instead can be applied, alone or in various combinations, to one or more of the other embodiments of the application, whether related to a system, apparatus, or method, whether or not such embodiments are described, and whether or not such features are presented as being a part of a described embodiment. Thus, the breadth and scope of the present application should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases, in some instances will not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying descriptions should not be construed as mandating a particular architecture or configuration or sequence of operations.

While various embodiments of the present disclosure have been described above, it should be understood that these embodiments have been presented by way of example only, and not by way of limitation. Likewise, the various diagrams and figures herein may depict an example architectural or other configuration for various embodiments of the disclosure, which is done to aid in understanding the features and functionality that can be included in the disclosure. The disclosure is not restricted to the illustrated example architectures or configurations, but disclosed features may be implemented using a variety of alternative architectures and configurations. Indeed, it will be apparent to one of skill in the art, upon reading this disclosure, how alternative functional, logical, or physical partitioning and configurations can be implemented to implement the features of the present disclosure. Also, a multitude of different constituent module names other than those depicted herein can be applied to the various partitions. Additionally, with regard to flow diagrams, operational descriptions, and method claims and associated operations, the order in which the operations are presented herein does not mandate that various embodiments be implemented to perform the recited functionality in the same order, unless the context dictates otherwise.

Although the disclosure is described above in terms of various example embodiments and implementations, it should be understood that the various features, aspects, and functionalities described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described example embodiments.

The invention claimed is:

1. A system, comprising:
an Internet banking platform communicatively coupled to a banking firewall device;
a communications network communicatively coupling the banking firewall device to a rewards program firewall device and configured to create a first secure communications channel between the Internet banking platform and a rewards account platform and a second secure communications channel between the Internet banking platform and a user computing device, the user computing device comprising a graphical interface;
wherein the Internet banking platform comprises one or more physical processors configured by machine-readable instructions to:
display, on the graphical interface, a request to a user-controlled account within the Internet banking platform to provide enrollment information that links a payment card associated with a first bank to a rewards account managed by the rewards program platform;
obtain, from the user computing device, the enrollment information specifying at least one payment card associated with the first bank to be linked to the rewards account;
generate an enrollment request based on the enrollment information;
transmit the enrollment request comprising the one payment card associated with the first bank to be linked to the rewards account to the rewards program platform via the first secure communication channel, the enrollment request being configured to generate an enrollment response indicating whether the payment card associated with the first bank has been linked to the rewards program platform;
upon linking the payment card associated with the first bank to the rewards program platform, receive, via the second secure communication channel, purchase data from a purchase made with the payment card associated with the first bank linked to the rewards program platform from a merchant corresponding to the rewards account; and
transmit the purchase data to the reward platform via the first secure communication channel;
wherein a payment card associated with a second bank of the user has been linked to the rewards account managed by the rewards program platform prior to transmission of the enrollment request for the payment card associated with the first bank.

2. The system of claim 1, wherein the one or more physical processors are further configured to receive, via the second secure communication channel from the reward program platform, an indication that a reward has been generated by the reward program platform based on the purchase data.

3. The system of claim 2, wherein the reward is generated using the purchase data acquired from a merchant subscribed to the rewards account platform, the purchase made using the payment card associated with the first bank.

4. The system of claim 3, wherein the user accesses the banking platform via the graphical interface of an application on the user computing device.

5. The system of claim 4, wherein the one or more physical processors are further configured to direct the user to the rewards account platform.

6. The system of claim 3, wherein a reward notification within the banking platform on the user computing device triggered by the reward obtained from the reward account platform generates an option on the graphical interface to accept the reward.

7. The system of claim 6, wherein the reward is selected from a reward group consisting of a discount with a merchant, cash back from a purchase made with the merchant, merchandise from the merchant, and services provided from the merchant.

8. A method generating subscription-based rewards from a rewards platform in a user banking platform comprising an Internet banking platform communicatively coupled to a banking firewall device, a rewards program platform coupled to a rewards program firewall device, a rewards account platform, and a user computing device comprising a graphical interface, the method comprising:
establishing, with the banking firewall device and the reward program firewall device, a first secure communications channel between the Internet banking platform and the rewards program platform;
establishing, with the banking firewall device, a second secure communications channel between the Internet banking platform and a user computing device;
displaying, on the graphical interface, a request to a user-controlled account within the Internet banking platform to provide enrollment information that links a payment card associated with a first bank to a rewards account managed by the rewards program platform;
obtaining, from the user computing device, the enrollment information specifying at least one payment card associated with the first bank to be linked to the rewards account;
generating an enrollment request based on the enrollment information;
receive, via the second secure communication channel, purchase data from a purchase made with the payment card associated with the first bank linked to the rewards program platform from a merchant corresponding to the rewards account; and
transmitting the enrollment request comprising the one payment card associated with the first bank to be linked to the rewards account to the rewards program platform via the first secure communication channel, the enrollment request being configured to generate an enrollment response indicating whether the payment card associated with the first bank has been linked to the rewards program platform;
upon linking the payment card associated with the first bank to the rewards program platform, receiving, via the second secure communication channel, purchase data from a purchase made with the payment card associated with the first bank from a merchant corresponding to the rewards account; and transmitting the purchase data to the reward platform via the first secure communication channel;

wherein a payment card associated with a second bank of the user has been linked to the rewards account managed by the rewards program platform prior to transmission of the enrollment request for the payment card associated with the first bank.

9. The method of claim 8, further comprising receiving, via the second secure communication channel from the reward program platform, an indication that a reward has been generated by the reward program platform based on the purchase data.

10. The method of claim 9, wherein the reward is generated using the purchase data acquired from a merchant subscribed to the rewards account platform, the purchase made using the payment card associated with the first bank.

11. The method of claim 8, wherein the banking platform is accessed from a mobile application, and wherein directing the user from the banking application to the rewards account within the rewards platform comprises launching a mobile application associated with the rewards account within the rewards platform.

12. The method of claim 8, further comprising displaying a graphic user interface that facilitates collecting the enrollment information.

\* \* \* \* \*